Patented Sept. 29, 1953

2,653,976

UNITED STATES PATENT OFFICE 2,653,976

GUANIDINE SULFATE FROM UREA AND SULFUR DIOXIDE

Johnstone S. Mackay, Old Greenwich, Conn., assignor to American Cyanamid Company, New York, N. Y., a corporation of Maine No Drawing. Application May 15, 1951, Serial No. 226,549

7 Claims. (Cl. 260—564)

The present invention relates to a novel method of preparing guanidine salts, in particular guanidine sulfates.

An object of the present invention is to heat together urea and sulfur dioxide under superatmospheric pressure to form a reaction mass comprising a guanidine sulfate. Other objects of the invention will be apparent from the following disclosure.

It has been found that if urea is heated with sulfur dioxide in a closed vessel at a temperature in the range of about 190°–300° C. a reaction mass comprising a guanidine sulfate is formed. Thereafter the pressure vessel is allowed to cool, after which it is vented, and a guanidine salt recovered from the resulting reaction mass by any well known means, e. g., by water extraction to obtain an aqueous solution of a guanidine sulfate, (i. e., either mono- or di-guanidine sulfate, or both) from which solution a guanidine sulfate or various guanidine salts may be obtained by conventional procedures.

It is preferred to employ a reaction temperature within the range of substantially 190°–300° C., and more preferably, a temperature within the range of substantially 210°–250° C. At temperatures substantially below 190° C., the reaction progresses too slowly for practical purposes, whereas at temperatures above 300° C. the decomposition of the desired guanidine sulfate is appreciable.

The pressure should be at least 100 p. s. i., and preferably considerably higher, e. g., 750–5000 p. s. i. or even higher.

In its simplest aspect the invention contemplates heating together only urea and sulfur dioxide, as shown in the following example.

Example 1

32 g. of sulfur dioxide and 30 g. of urea are charged to a 300-cc. autoclave equipped with stirrer. The autoclave is sealed and thereafter heated with stirring for 2 hours at 210° C. under the autogenous pressure. At the end of this time the autoclave is allowed to cool. It is then vented and the reaction mass scraped into a beaker containing 200 cc. of water at room temperature. The resulting slurry is filtered and the filtrate tested with ammonium picrate solution in the usual way to determine the presence of the guanidinium ion. A heavy yellow precipitate of guanidine picrate forms, which can be filtered and recovered.

Example 2

In a preferred modification of the invention ammonia is added along with the sulfur dioxide and urea, whereby greater yields of guanidine values are obtained, as follows:

32 g. of sulfur dioxide, 17 g. of ammonia, and 30 g. of urea are heated together in a 300-cc. autoclave equipped with stirrer for 2 hours at 220° C. The maximum autogenous pressure developed is about 850 p. s. i. At the end of the reaction time, the reaction mass is scraped into a beaker containing 300 cc. of water and the resulting slurry filtered. A liter of acetone is then added to the filtrate to reduce the solubility of the dissolved guanidine sulfate, which is then allowed to precipitate overnight. The yield of guanidine sulfate is equivalent to a urea conversion of 36.4%.

Virtually any proportions of reactants will give a guanidine sulfate. For example a mol ratio of urea:sulfur dioxide of 1–100:1–100 will produce some guanidine sulfate provided the proper temperatures and pressures are observed. When using the preferred embodiment involving added ammonia, such ammonia can be added in any amount. The preferred mol ratio of urea:$SO_2$:$NH_3$, is, however, approximately 1:1:1–4.

The isolation of guanidine sulfate from its aqueous solution may be effected by any of the conventional means, such as by cooling or evaporating to cause crystallization, or by adding a water-miscible organic liquid, such as acetone above mentioned, to decrease the solubility of the sulfate and cause its precipitation. The guanidine sulfate resulting after aqueous extraction of the reaction mass of the present invention is usually predominantly in the form of the diguanidine sulfate. As is well known, the more acidic monoguanidine sulfate can be readily prepared therefrom by acidifying an aqueous solution of the diguanidine sulfate with sulphuric acid. In general, at a pH of about 2 the salt is predominantly in the form of the monoguanidine sulfate, whereas at a pH of about 7 the sulfate is predominantly in the form of the diguanidine sulfate.

As the acetone precipitation method is rather expensive, it is generally preferred to convert the guanidine sulfate to some other less soluble guanidine salt such as the nitrate, picrate, carbonate, or phosphate when operating the process on a large scale. The preparation of such less soluble salts is effected by simply adding an equivalent amount of the corresponding acid or metallic or ammonium salts of the corresponding acid to the aqueous solution of the sulfate, and inducing crystallization by conventional means.

The guanidine can also be recovered as guanidine hydrate by dissolving the dry reaction mixture in an alcohol, such as ethanol, adding an excess of potassium hydroxide to precipitate the sulfate ion as potassium sulfate, and thus provide an alcoholic solution of the free hydrate. Such guanidine hydrate may then be isolated from solution, if desired, by conventional procedures.

The guanidine salts provided by the process of the present invention are valuable chemicals, being useful as fireproofing agents, in the preparation of resins and blueprint materials, such as intermediates in the preparation of chemotherapeutic agents, explosives, pharmaceuticals, surface-active agents, and the like.

While the invention has been described with particular reference to specific embodiments, it is to be understood that it is not to be limited thereto but is to be construed broadly and restricted solely by the scope of the appended claims.

I claim:

1. The process which comprises heating together urea and sulfur dioxide at a temperature within the range of about 190° to 300° C. in a closed vessel under a pressure of at least 100 p. s. i. whereby a reaction mass containing a guanidine sulfate is formed.

2. The process according to claim 1 in which the urea and sulfur dioxide are heated together in the presence of added ammonia.

3. The process according to claim 2 in which the reaction is conducted at a temperature within the range of 210° to 250° C.

4. The method according to claim 3 in which the pressure is 750 to 5000 p. s. i.

5. The method according to claim 4 in which the urea:sulfur dioxide:ammonia mol ratio is approximately 1:1:1–4.

6. The method that comprises heating together urea, sulfur dioxide, and ammonia at a pressure within the range of 100 to 5000 p. s. i. and at a temperature within the range of 190° to 300° C., whereby a reaction mass containing a guanidine sulfate is formed, and recovering the thus-formed guanidine sulfate.

7. The method of producing a guanidine salt which comprises reacting urea, ammonia, and sulfur dioxide at a temperature of about 220° C. in a closed vessel under superatmospheric pressure.

JOHNSTONE S. MACKAY.

No references cited.